Patented Apr. 26, 1927.

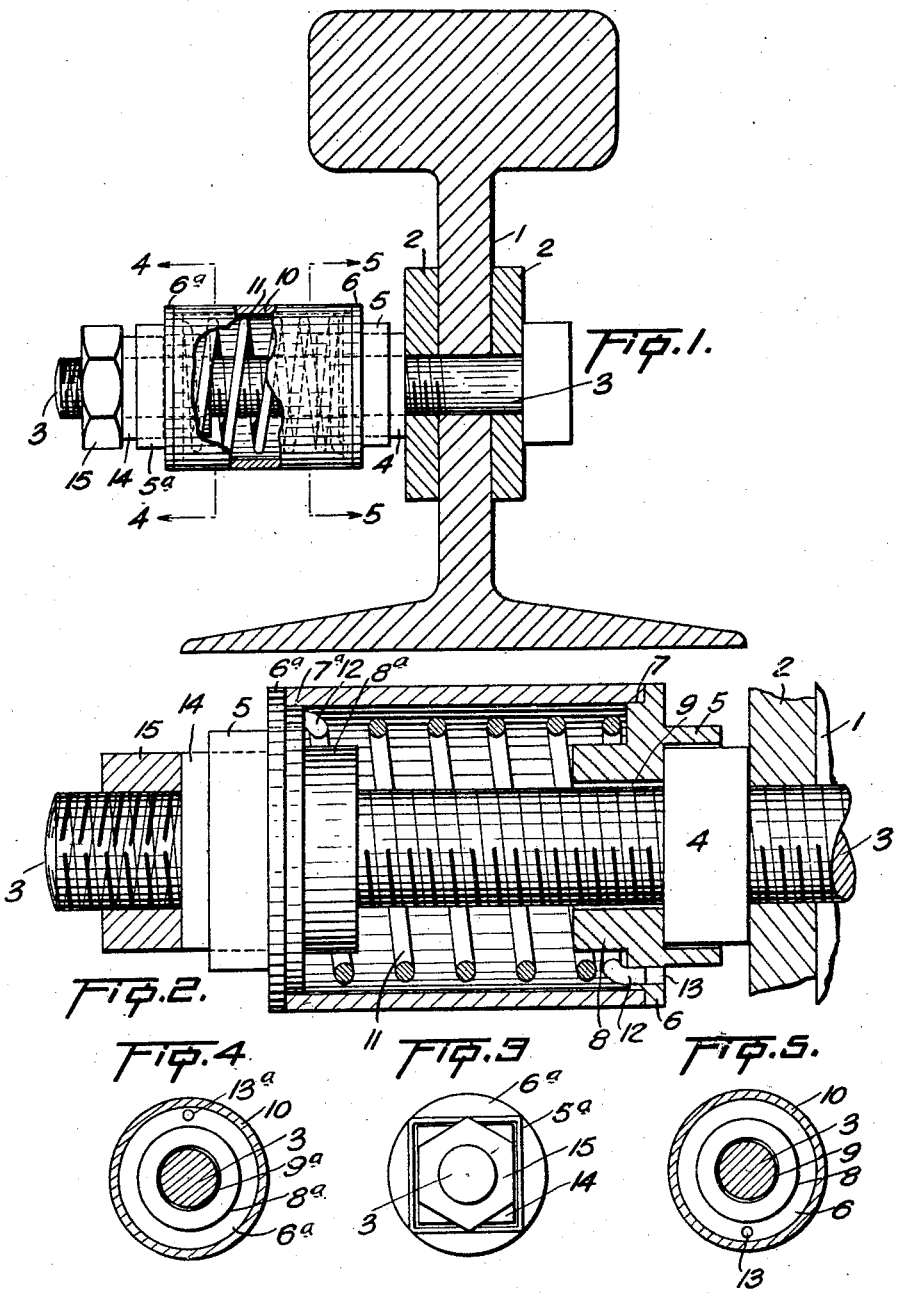

1,625,982

UNITED STATES PATENT OFFICE.

HENRY BROWNLEE, OF PORT HOPE, ONTARIO, CANADA.

COMBINED LOCK NUT AND NUT TIGHTENER.

Application filed January 11, 1926. Serial No. 80,653.

My invention relates to improvements in combined locknuts and nut tighteners and the object of the invention is to devise such a device particularly applicable to the bolts used in connecting railway rails together.

The primary object of the invention is to devise a simple and effective locknut which will prevent the nut on the bolt becoming loose and a further object is to devise means for automatically tightening the nut should the bolts stretch or become elongated, as frequently occurs.

My invention consists of a device constructed and arranged all as hereinafter more particularly described and illustrated in the accompanying drawing in which:

Fig. 1 is a vertical cross section through a rail and fish plates showing my device applied thereto, the casing or sleeve of the same being broken away to expose the interior thereof.

Fig. 2 is an enlarged longitudinal section.

Fig. 3 is an end view.

Fig. 4 is a section on the line 4—4 Figure 1, and

Fig. 5 is a section on the line 5—5 Figure 1.

Like characters of reference indicate corresponding parts in the different views.

1 is the web of the rail to which the fish plates 2 are applied in the orthodox manner on each side thereof. 3 is a headed bolt adapted to extend through the fish plates and rail web and distinguished from an orthodox bolt by having a double thread on its free end. For instance, if the ordinary thread of the bolt is a right hand thread such free end will be provided in addition with a left hand thread. It is found that this can be readily done by running the required die down the free end of the bolt and the two threads will not interfere with each other but will permit both the right hand threaded nut and left hand threaded nut to be screwed thereonto.

4 is the nut applied to the bolt 3 and in the case illustrated would be threaded right hand. Such nut is screwed down against the fish plate 2. 5 is a socket member of a shape corresponding to the nut 4 only slightly larger, adapted to be applied thereto and having a flange 6 with the rabbet 7 in the side opposite from the socket member 5. 8 is a reduced shank extending oppositely from the socket member 5 and provided with the central orifice 9 therein which communicates with the interior of the socket member, said bolt 3 extending through the orifice 9.

A second socket member 5ª with a flange 6ª, rabbet 7ª, reduced shank 8ª, and central orifice 9ª of identical construction to that above described extends over the bolt 3 and is positioned in opposed relation to the first socket member, flange and shank above described, such members being held in spaced relation by means of the sleeve 10, the ends of which extend into the rabbets 7 and 7ª. 11 is a spiral spring provided with bent ends 12 adapted to extend into holes 13 and 13ª in the inner faces of the respective flanges 6 and 6ª.

14 is a second nut threaded onto the bolt 3 and positioned in the outer socket member 5, said nut in the present case being threaded right hand.

15 is a left hand threaded locknut adapted to be threaded onto the end of the bolt 3 and to lock the nut 14 in position.

The device functions as follows:

Assuming that it is applied to the bolt 3 in the manner above described and as illustrated in the drawing it will be seen that the device will effectually prevent the nut 4 from coming loose. Should the bolt 3 stretch and the nut 4 come away from the face of the fish plate 2 the spring 11 which is twisted to a certain extent when the device is applied to the bolt 3 will have a tendency to untwist. The nut 14 being held in position on the bolt by the locknut 15 the socket member 5ª and flange 6ª will be held against rotation and thus the inner end of the spring under the above mentioned condition will rotate in a clockwise direction, rotating the flange 6 and its socket member 5 with the result that the nut 4 will be turned right hand and thus tighten itself against the face of the fish plate 2.

From the above description it will be apparent that I have devised a simple and effective locknut and nut tightener for bolts which can be readily applied thereto.

What I claim as my invention is.

1. In a combined locknut and nut tightener, the combination with a bolt, of a nut threaded thereon, a nut receiving socket member, a second nut threaded on the bolt, means for locking the second nut on the bolt, a second nut receiving socket member, means extending between the socket members whereby the first nut is locked against outward longitudinal and consequently retrograde movement relatively to the second locked nut, and means extending between the socket members and secured to each for turning the first mentioned socket member and its nut upon the bolt being elongated.

2. In a combined locknut and nut tightener, the combination with a bolt, of a nut threaded thereon, a nut receiving socket member, a second nut threaded on the bolt, a second nut receiving socket member, means extending between the socket members whereby the first nut is locked against outward longitudinal and consequently retrograde movement relatively to the second locked nut, and a circumferentially twisted spiral spring connected at its ends to the socket members.

3. In a combined locknut and nut tightener, the combination with a bolt, of a nut threaded thereon, a nut receiving socket member, a second nut threaded on the bolt, means for locking the second nut on the bolt, a second nut receiving socket member, a sleeve positioned between the first and second socket members, and a circumferentially twisted spiral spring contained within the sleeve and connected at its ends to the socket members.

4. In a combined locknut and nut tightener, the combination with a threaded bolt having its extremity also threaded in the reverse direction, a nut threaded onto the bolt, a nut receiving socket member, a second nut threaded onto the same thread of the bolt as the first mentioned nut, a third nut threaded onto the reverse thread of the bolt for locking the second nut against outward movement, a second nut receiving socket member, means extending between the socket members whereby the first nut is locked against outward longitudinal and consequently retrograde movement relatively to the second locked nut, and a circumferentially twisted spiral spring connected at its end to the socket members.

HENRY BROWNLEE.